US012675390B2

(12) United States Patent
Sondhi et al.

(10) Patent No.: US 12,675,390 B2
(45) Date of Patent: Jul. 7, 2026

(54) LARGE LANGUAGE MODEL-BASED TEST-CASE REFINEMENT FOR APPLICATION PROGRAMMING INTERFACES

(71) Applicant: INTERNATIONAL BUSINESS MACHINES CORPORATION, Armonk, NY (US)

(72) Inventors: Devika Sondhi, Noida (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/951,741

(22) Filed: Nov. 19, 2024

(65) Prior Publication Data

US 2026/0140852 A1     May 21, 2026

(51) Int. Cl.
    *G06F 11/36*        (2025.01)
    *G06F 9/54*         (2006.01)
    *G06F 11/3668*      (2025.01)
(52) U.S. Cl.
    CPC ............ *G06F 11/3684* (2013.01); *G06F 9/54* (2013.01)
(58) Field of Classification Search
    CPC ......... G06F 11/36; G06F 11/3684; G06F 9/54
    See application file for complete search history.

(56) References Cited

U.S. PATENT DOCUMENTS

| | | | | |
|---|---|---|---|---|
| 11,645,139 B2 * | 5/2023 | Cser | ...................... | G06F 11/079 |
| | | | | 714/25 |
| 12,353,317 B1 * | 7/2025 | Surace | ................ | G06F 11/3684 |

(Continued)

FOREIGN PATENT DOCUMENTS

| | | |
|---|---|---|
| CN | 117806980 B | 5/2024 |
| CN | 118445192 A | 8/2024 |
| KR | 10-2024-0065047 A | 5/2024 |

OTHER PUBLICATIONS

"How to Design Prompts for Test Case Wizard and Implement It in OpenAI Playground", retrieved from web https://www.linkedin. com/pulse/how-design-prompts-test-case-wizard-implement-openai-playground-j-78xzf, dated Aug. 22, 2024, 5 pages.

(Continued)

*Primary Examiner* — Kamini B Patel

(74) *Attorney, Agent, or Firm* — Anthony Curro

(57)     ABSTRACT

Using a large language model to improve testing of an application programming interface. Access an application programming interface specification, the application programming interface specification used for testing of an application programming interface. Access one or more test cases previously generated for testing the application programming interface which when utilized to test the application programming interface resulted in one or more errors. Access the one or more errors generated when testing the application programming interface using the one or more test cases previously generated. Input the application programming interface specification, the one or more test cases previously generated, and the one or more errors into a large language model for refinement by the large language model. Receive a modified set of the one or more test cases, modified by the large language model. Receive a modified application programming interface specification, modified by the large language model.

16 Claims, 4 Drawing Sheets

(56)                    References Cited

U.S. PATENT DOCUMENTS

| | | | | |
|---|---|---|---|---|
| 2017/0353375 | A1* | 12/2017 | Paropkari | H04L 43/50 |
| 2022/0091967 | A1* | 3/2022 | Wang | G06F 11/3684 |
| 2023/0251960 | A1* | 8/2023 | Sharma | G06N 5/04 |
| | | | | 717/124 |
| 2024/0054233 | A1* | 2/2024 | Ohayon | G06F 21/54 |
| 2024/0111498 | A1* | 4/2024 | Vaughn | G06F 8/30 |
| 2024/0256423 | A1* | 8/2024 | Zhang | G06F 8/71 |
| 2024/0311272 | A1* | 9/2024 | Schaefer | G06N 3/044 |
| 2024/0320130 | A1* | 9/2024 | Sondhi | G06F 9/54 |
| 2024/0378395 | A1* | 11/2024 | Sommers | H04L 41/08 |
| 2025/0013559 | A1* | 1/2025 | Jiao | G06F 11/3684 |
| 2025/0044991 | A1* | 2/2025 | Darji | G06F 3/0619 |
| 2025/0045185 | A1* | 2/2025 | Tang | G06F 11/3684 |
| 2025/0061358 | A1* | 2/2025 | Magendie | G06N 5/02 |
| 2025/0077397 | A1* | 3/2025 | Sen | G06F 11/3698 |
| 2025/0265178 | A1* | 8/2025 | Jensen | G06F 11/3688 |

OTHER PUBLICATIONS

"IBM Watsonx Evaluating Models", retrieved from web https://www.ibm.com/docs/en/watsonx/saas?topic=assets-evaluating-ai-models dated Aug. 16, 2024, 2 pages.
"lexnlp.extract.en.constraints: Extracting constraint statements", ContraxSuite, LLC, 2018, 3 pages.
Arcuri Andrea "EvoMaster: Evolutionary Multi-context Automated System Test Generation", 2018 IEEE 11th International Conference on Software Testing, Verification and Validation (ICST), Apr. 9-13, 2018, 4 pages.
Atlidakis et al., "RESTler: Stateful REST API Fuzzing", 2019 IEEE/ACM 41st International Conference on Software Engineering (ICSE), May 25-31, 2019, 11 pages.
Cadar et al. "EXE: Automatically Generating Inputs of Death", ACM Transactions on Information and System Security (TISSEC), Dec. 1, 2008, pp. 1-38, vol. 12, Issue 2, Article No. 10.
Disclosed Anonymously, IP.com No. IPCOM000272674D "Method and System for Prediction of Large Scale Conversion Rate (CVR) through Dynamic Transfer Learning of Global and Local Features", Jul. 12, 2023, 10 pages.
Godefroid et al, "DART: directed automated random testing", PLDI '05: Proceedings of the 2005 ACM SIGPLAN conference on Programming language design and implementation, Jun. 12, 2005, pp. 213-223.
Karlsson et al. "Quick REST: Property-based Test Generation of Open API-Described RESTful APIs", 2020 IEEE 13th International Conference on Software Testing, Validation and Verification (ICST), Dec. 29, 2019, 11 pages.
Kim et al. "Adaptive REST API Testing with Reinforcement Learning", 2023 38th IEEE/ACM International Conference on Automated Software Engineering (ASE), Sep. 8, 2023, 13 pages.
Liu et al., "Morest: Model-Based RESTful API Testing with Execution Feedback", ICSE '22: Proceedings of the 44th International Conference on Software Engineering, pp. 1406-1417, Jul. 5, 2022, 12 pages.
Patrick, et al. "Retrieval-Augmented Generation for Knowledge-Intensive NLP Tasks." Advances in Neural Information Processing Systems, Apr. 12, 2021, 19 pages.
Sen et al., "CUTE: a concolic unit testing engine for C", ACM SIGSOFT Software Engineering Notes, Sep. 1, 2005, pp. 263-272, vol. 30, Issue 5.
Shizhe et al. "Active prompting with chain-of-thought for large language models." arXiv preprint arXiv:2302.12246, 2023, 21 pages.
Sri et al. "Automating REST API Postman Test Cases Using LLM", arXiv:2404.10678, 2024, 11 pages.

* cited by examiner

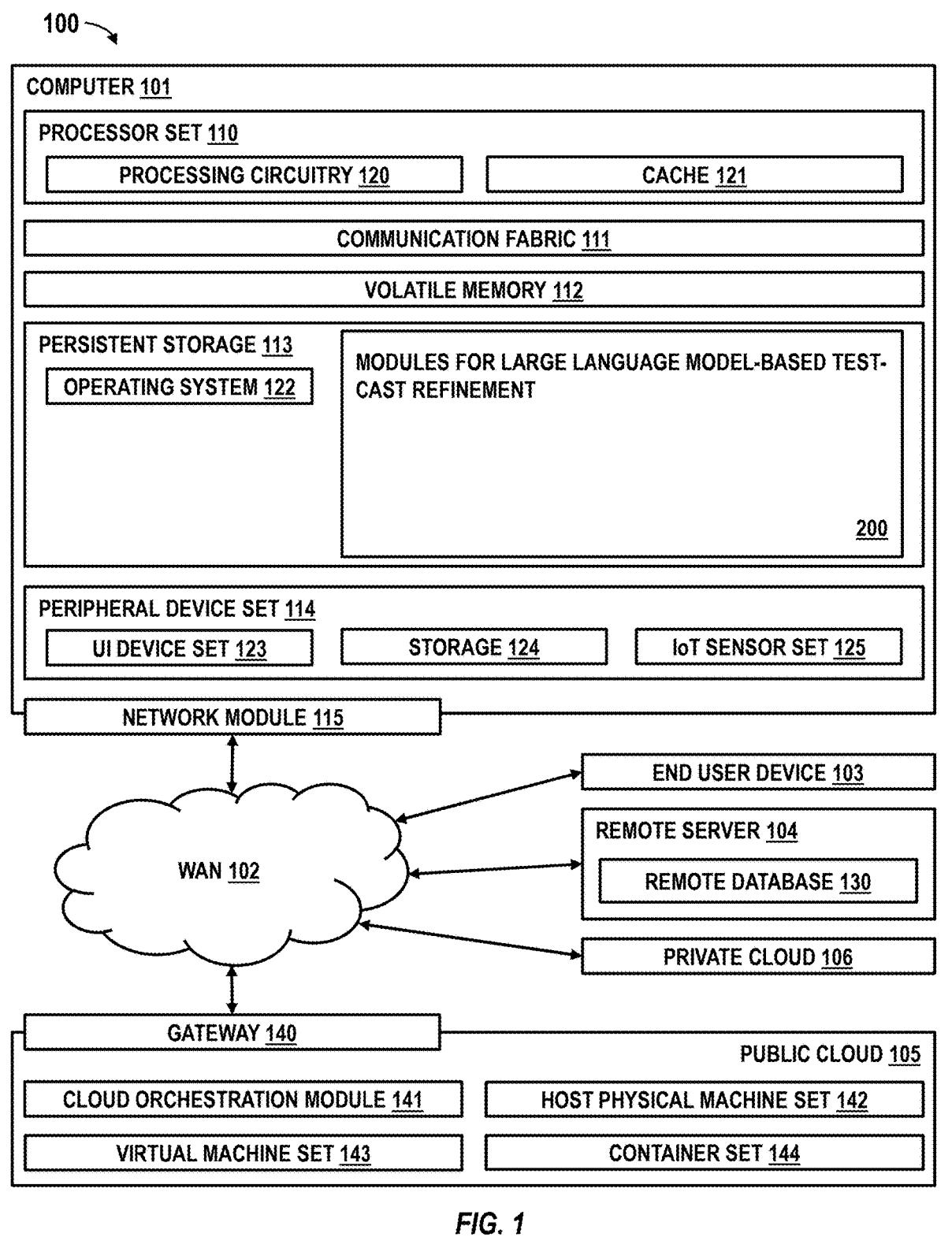

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

MODULES FOR LARGE LANGUAGE MODEL-BASED TEST-CAST REFINEMENT

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

*FIG. 1*

LARGE LANGUAGE MODEL-BASED TEST-CASE REFINEMENT FOR APPLICATION PROGRAMMING INTERFACES

FIELD OF THE INVENTION

The present invention relates generally to artificial neural networks and application programming interfaces, and to, more particularly, using a large language model to generate and refine test cases for testing of application programming interfaces.

BACKGROUND

Application programming interfaces (alternatively referred to herein as "APIs") generally, in modern computer applications are a type of software interface allowing input and output to other applications or packages of software. APIs facilitate access to and interoperability with packages of software or other applications while not providing full details of how the attached software operates. Web APIs, in particular, are frequently used to provide access for a web browser or a web server to resources, services, etc. available via the internet or other computer network. Since users are becoming increasingly reliant upon websites, services, resources, etc. available via the web, as well as increasingly computer savvy, errors such as HTTP status codes when attempting to access web resources such as a banking website or a university website also have become less tolerable.

Functional testing of APIs and particularly web APIs, therefore, remains an important part of the software development process. At present, testing, however, may be a time-consuming process which is error-prone itself. Black-box texting regimes may be utilized, for example, in testing web APIs, or, alternatively, other testing techniques may be utilized. A specification such as an OpenAPI Specification which describes web APIs may provide natural language descriptions, sample source code, test cases, descriptions of errors, design information, etc. to facilitate testing and editing of web APIs, but even such a specification which provides a significant amount of detail on a web API may be time-consuming to review and edit, and it may even contain errors itself.

A need presents itself, therefore, for an automated way to facilitate testing of a APIs which is effective and time-efficient.

SUMMARY

Embodiments of the present invention disclose a method, system, and computer program utilizing a computing device associated with a large language model to improve testing of an application programming interface. The computing device accesses an application programming interface specification, the application programming interface specification used for testing of an application programming interface. The computing device accesses one or more test cases previously generated for testing the application programming interface which when utilized to test the application programming interface resulted in one or more errors. The computing device accesses the one or more errors generated when testing the application programming interface using the one or more test cases previously generated. The application programming interface, the one or more test cases previously generated, and the one or more errors are input into the application programming interface specification into a large language model for refinement by the large language model. A modified set of the one or more test cases, modified by the large language model is received. A modified application programming interface specification, modified by the large language model is received.

BRIEF DESCRIPTION OF THE DRAWINGS

FIG. 1 represents a networked computer environment 100, in accordance with an embodiment of the present invention.

DETAILED DESCRIPTION

Figure 2:
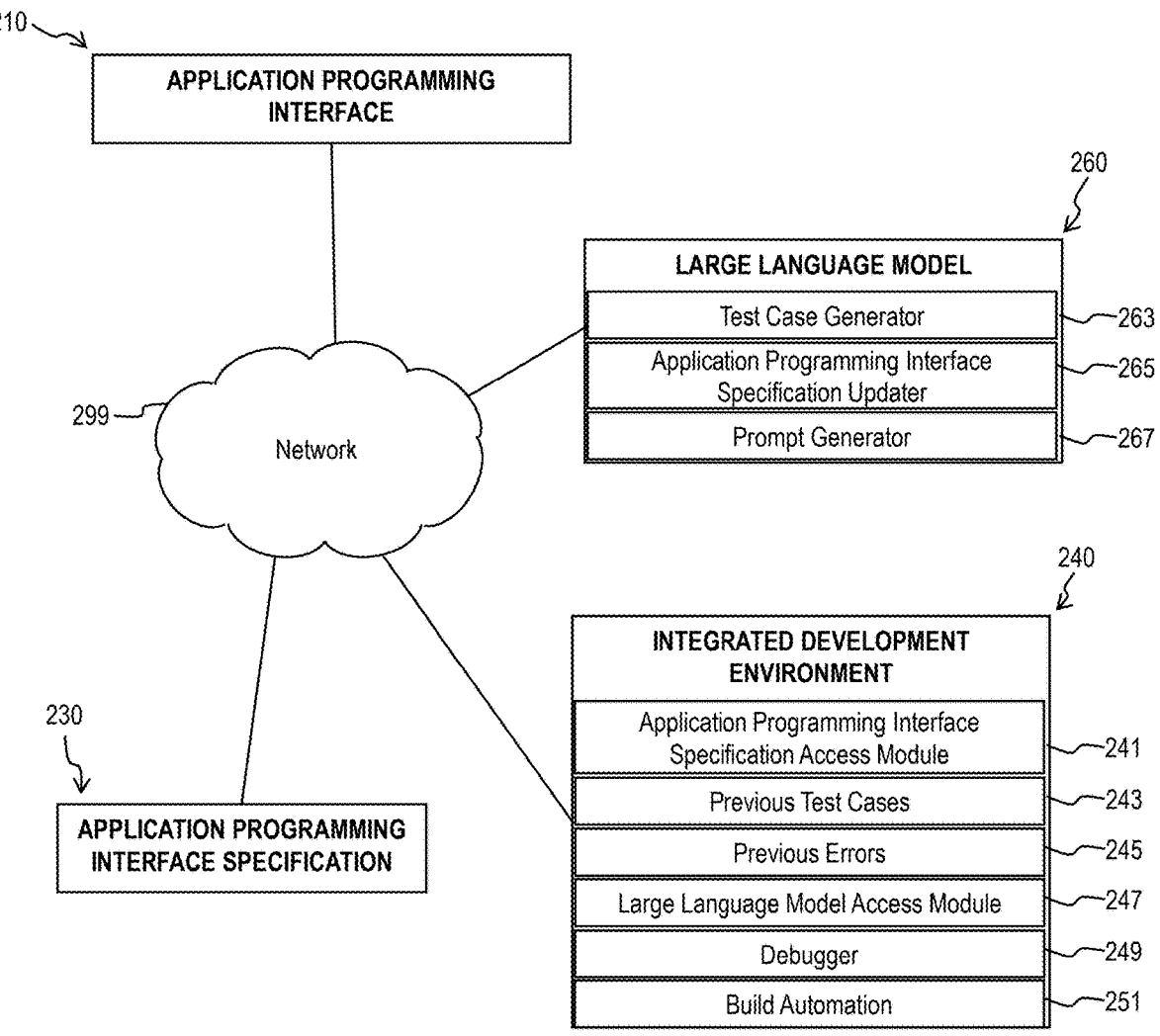
FIG. 2 is a functional block diagram illustrating modules 200 for large language model-based test-cast refinement, in accordance with an embodiment of the present invention.

As discussed, as the value of application programming interfaces for accessing any type of software as well as specifically web APIs increases, the need for reliability also increases. Many users of, for example, a banking website or a university website would be very frustrated by, for example, a 4xx status code error when attempting to access his or her banking website while paying a bill or attempting take an online test. Thus, there is a pressing need to minimize errors in web APIs or other APIs in order to best enhance quality-of-service to users of these APIs. The presently disclosed embodiments relate to one or more methods, systems, and computer program products to utilize an artificial intelligence model such as a neural-network based large language model to improve testing of web APIs and other APIs.

Twenty-first century artificial intelligence models are increasingly utilized in a variety of fields including in computer vision, healthcare, self-driving cars, as well as others but are becoming particularly widely used in natural language processing applications. Natural language processing by neural-network based large language models ("LLMs"), in particular, provides impressive results in a variety of fields including in translation, source code development, virtual assistants, as well as others. Presently disclosed embodiments relate to novel utilization of LLMs to improve testing of APIs. In an embodiment of the invention, in order to improve testing of a web API, an LLM receives as input previously generated test cases for testing of the web API and an application programming interface specification associated with the web API to be tested, and utilizes these to generate modified test cases as well as modified application programming interface specification(s). The modified test cases as well as the modified application programing interface specification may be utilized, in various embodiments of the invention, to better test the web API in question. Embodiments of the invention may be implemented in different ways, while still being contemplated inside the scope of the invention. Presently disclosed embodiments may be implemented as a part of an integrated development environment, other developer tool, as a stand-alone program, or in another fashion while still being contemplated within the scope of the invention disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as associated with modules 200 for large language model-based test-cast refinement. In addition to modules 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and modules 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processor set 110 may be alternatively be referred to herein as one or more "computing device(s)," but computing devices may also refer to one or more CPUs, microchips, integrated circuits, embedded systems, or the equivalent, presently existing or after-arising. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in modules 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in modules 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a functional block diagram illustrating modules 200 for large-language model-based test-case refinement, in accordance with an embodiment of the present invention. In an embodiment of the invention, such as displayed in FIG. 2, application programming interface 210 is operatively connected to application programming interface specification 230, integrated development environments 240, and large language model 260. Application programming interface 210 may be any sort of computer software interface (such as a web API) which provides for input and output to other applications or packages of software. In embodiments of the invention, application programming interface 210 does not provide full access to all details of the other applications or packages of software which it is providing input/output access for (such as by providing direct access to the source code which application programming interface 210 is providing input/output access for). In embodiments of the invention where application programming interface 210 is a web API, application programming interface 210 provides access to a web browser, web server, or other resources, services, etc. available via network 299 (such as a banking website, a university website, a login server, or any other). As discussed, in order to provide the best quality of service, a web API or any other application programming interface 210 must be extensively tested to avoid to the greatest extent possible errors when accessing the resources, services, etc. In order to facilitate testing of application programming interface 210, an application programming interface specification 230 is displayed, also connected via network 299. Application programming interface specification 230 is an electronically available document which describes, in various embodiments of the invention, how to build and utilize various functionality associated with application programming interface 210. Application programming interface specification 230 may be utilized, for example, in facilitating a developer utilizing and testing the application programming interface 210. Application programming interface specification 230 may contain some combination of natural language descriptions, source code, test cases, and other information which would be of interest to a developer, particularly in building and testing application programming interface 210. Unfortunately, application programming interface specification 230 may be difficult to understand, incomplete, or contain semantics which lead to further errors when utilized to test application programming interface 210. Other issues may exist with application programming interface specification 230 as well, any of which lead to a need for embodiments of the invention, as further discussed herein.

As further displayed in FIG. 2, integrated development environment 240 represents hardware and/or software for provision of various facilities for software development, including, in various embodiments of the invention, a source code editor, build automation, debugger, etc. in order to allow a developer to build, test, and execute various types of software, including application programming interface 210 itself as well as, in various embodiments of the invention, associated software packages. Integrated development environment 240 facilitates a user, for example, in testing application programming interface 210. In an embodiment of the invention, integrated development environment 240 is operatively connected to large language model 260. Large language model 260 may be any sort of artificial intelligence based computational model for utilization in connection with natural language processing based tasks, as described herein. In various embodiments of the invention, large language model 260 is associated with a neural-network based statistical model which is trained in a supervised or semi-supervised fashion on a large quantity of text, and is utilized by integrated development environment 240 in connection with application programming interface specification 230 in order to generate improved test cases for testing of application programming interface 210, as further discussed herein.

As also displayed in FIG. 2, in various embodiments of the invention, application programming interface 210, application programming interface specification 230, integrated development environment 240, and large language model 260 are connected to and via network 299. In various embodiments of the invention, network 299 represents, for example, any sort of computer network such as a local area network (LAN), a wide area network (WAN) such as the Internet, and includes wired, wireless, or fiber optic connections. In various embodiments, network 299 is substantially the same as WAN 102, discussed in connection with FIG. 1 herein. In general, network 299 may be any combination of connections and protocols that will support communications between application programming interface 210, application programming interface specification 230, integrated development environment 240, and large language model 260, in accordance with embodiments of the invention. In further embodiments of the invention, network 299 may represent an internal bus associated with a single or multicore processor executing one or more of application programming interface 210, application programming interface specification 230, integrated development environment 240, and large language model 260.

Discussing elements displayed in FIG. 2 in further detail, application programming interface 210 may be any sort of computer software interface (such as a web API) which provides for input and output to other applications or packages of software. Application programming interface 210 must be extensively tested in order to avoid errors when utilized to access other packages of source code, applications, resources, etc. In embodiments of the invention, application programming interface 210 does not provide full access to all details (such as the source code) of the other applications or packages of software which it is providing input/output to. Application programming interface 210, in various embodiments of the invention, may be a web API for providing access to a web browser or web server to resources, services, etc. available via network 299 (such as to a banking website, a login server, or any other). In embodiments of the invention, during development and testing phases, application programming interface 210 may be accessed by integrated development environment 240 for development and testing purposes, as further discussed below, with assistance of large language model 260 particularly in testing, as further discussed herein. After testing and roll-out, application programing interface 210 may be utilized in providing access to other packages of source code, applications, resources, etc. with a minimum of errors, after improvement by embodiments of the invention.

Continuing with regard to FIG. 2, application programming interface specification 230 represents hardware and/or software associated with an electronically available document which describes, in various embodiments of the invention, how to build and/or utilize various functionality associated with application programming interface 210. Application programming interface specification 230 may be used to facilitate a developer testing and utilizing the application programming interface 210. Application programming interface specification 230 may contain some combination of natural language descriptions, source code, test cases, and other information describing various aspects of application programming interface 210 which would be of interest to a developer, particularly in building and testing application programming interface 210. In an embodiment of the invention, application programming interface 210 is in a format such as OpenAPI™ (trademark owned by the Linux Foundation®), which describes, for example, requirements of the application programming interface 210, design of the application programming interface 210, configuration of the application programming interface 210, as well as information regarding publication, development, deployment, and testing of application programing interface 210. Other presently existing or after arising alternatives to OpenAPI™ exist as well, as one of skill in the art would understand, which may provide at least some substantially equivalent or additional information about application programming interface 210. In embodiments of the invention, application programming interface specification 230 may be incorrect or incomplete, and embodiments of the invention described herein present advantages of improving testing in such circumstances when interface specification 230 is incorrect or incomplete, and leading to errors associated with application programming interface 210.

Still continuing with regard to FIG. 2, integrated development environment 240 represents software and/or hardware for provision of various facilities for software development, including a source code editor (not shown), build automation 251, debugger 249, etc. in order to allow a developer to build, test, and execute various types of software, including application programming interface 210 itself as well as, in various embodiments of the invention, associated software packages. Integrated development environment 240 provides to a user (such as a developer), the various facilities necessary in order to write, edit, compile, and execute various software including testing of application programming interface 210. In order to improve testing of application programming interface 210, in various embodiments of the invention, integrated development environment 240 is utilized in connection with large language model 260 in providing improved testing to application programming interface 210, with functionality as described herein. In various embodiments of the invention, integrated development environments 240 includes one or more of application programming interface specification access module 241, previous test cases 243, previous errors 245, large language model access module 247, debugger 249, and build automation 251.

Application programming interface specification access module 241 represents software and/or hardware for access of application programming interface specification 230 via network 299. As discussed herein, application programming interface specification 230 provides a number of details regarding application programming interface 210 which are utilized in various embodiments of the invention in conjunction with large language model 260 to improve testing of application programming interface specification 210. Application programming interface specification access module 241 also is utilized, in various embodiments of the invention, in conjunction with large language model 260, to modify application programing interface 210 to provide further updated or more detailed information on application programming interface 10 which allows for improved development and the best testing possible of application programming interface 210. Later execution of further iterations of embodiments of the invention can, in turn, utilize the modified application programming interface specification 230.

Previous test cases 243 represents hardware and/or software for access and/or storage of previous tests cases which have been utilized previously in connection with testing of application programming interface 210. Previous test cases may, for example, be utilized to test various aspects or portions of, for example, input or output to application programming interface 210. Previous test cases 243, in an embodiment of the invention, may include, for example a series of values associated with each of different parameters to be input into application programming interface 210 to see whether the output received is correct, whether an error (such as a 4xx error) is received in response to input, etc. Previous test cases which have resulted in errors in particular may be utilized in embodiments of the invention to provide for thorough testing of application programming interface 210. In an embodiment of the invention, previous test cases 243 for testing of application programming interface 210 are stored in JSON file format which describes one or more parameters, one or more data values for each parameter, as well as a sequence of operations in order to fully and correctly test application programming interface 210.

Previous errors 245 represents hardware and/or software for access and/or storage of previous errors associated with execution of previous test cases 243 by debugger 249 of integrated development environment 240. Previous errors 245, as discussed further below, may be generated during previous testing of application programming interface 210. Previous errors 245, in an embodiment of the invention, are utilized by large language model 260 in generation of updated test cases for further testing of application programming interface 210. In embodiments of the invention, previous errors 245 may include HTTP status codes such as 4xx responses when application programming interface specification 270 is a web API. Such errors may be generated when attempting to access, for example, a web resource. In alternative embodiments of the invention, previous errors 245 may include compilation or runtime errors, which are also contemplated as being with the scope of embodiments of the invention.

Large language model access module 247 represents software and/or hardware for access, input, provision of data, test cases, previous errors, application programming interface specification 230, etc. to large language model 260 in order to improve testing of application programming interface 210, as further discussed herein. As discussed elsewhere herein, large language model 260 utilizes, in various embodiments of the invention, one or more of the input data, test cases, previous errors, application programming interface specification 230, etc. in outputting a modified set of one or more test cases as well as a modified application programming interface 230. Large language model access module 247 is also utilized to receive responses from large language model 260 which contain, for example, modified test cases for testing of application programming interface 210 as well as, in embodiments of the invention, modified application programming interface specification(s) 230 for further utilization by integrated development environment 240 in order to improve testing of application programming interface 210.

Debugger 249 represents software and/or hardware for debugging of application programming interface 210 and other source code, applications, software, etc. In an embodiment of the invention, in debugging of application programming interface 210, debugger 249 in operation with large language access module 247, accesses previous test cases 243, previous errors 245, and application programming interface specification 230 and inputs these into large language model 260 in order for large language model 260 to generate updated and modified test cases for testing of application programming interface 210. In embodiments of the invention, large language model 260 also modifies and updates application programming interface 210. As would be understood by one of skill in the art, response error messages such as a 4xx responses (available as previous errors 245) which occurred during previous testing of application programming interface 210 are often indicative of why the request was invalid and large language model 260 may utilize these in creating updated test values, as well as updated application programming interface specification(s) 230. In an embodiment of the invention, debugger 249 utilizes the modified set of the one or more test cases and the modified application programming interface 210 in further testing of application programming interface 210 (as by repeated execution of embodiments of the invention).

Build automation 251 represents software and/or hardware for automatically compiling, building, etc. the latest version of application programming interface 210 and associated computer software. In embodiments of the invention, debugger 249 functions in conjunction with build automation 251 in automatically compiling and executing versions of application programming interface 210 and/or associated software for testing and other purposes. As would be understood by one of skill in the art, it may be necessary to compile and/or build application programming interface 210 before testing.

Finally, with regard to FIG. 2, large language model 260 represents software (and, in various embodiment, associated computer hardware), for storing, accessing, executing, etc. one or more artificial intelligence based computational models for utilization in connection with natural language processing based tasks, as described herein. In various embodiments of the invention, large language model 260 is associated with a neural-network based statistical model which is trained in a supervised or semi-supervised fashion on a large quantity of text, and is utilized by integrated development environment 240 in connection with application programming interface specification 230 in order to generate improved test cases for testing of application programming interface 210, as further discussed herein, as well as, in embodiments of the invention, updating by the large language model 360 the application programming interface 230. Large language model 260, in performance of its functionality, may be accessed in a manner consistent with presently existing or after-arising techniques. In an embodiment of the invention, large language model may be accessed and utilized via prompt engineering by a developer utilizing integrated development environment 240 (customizing a prompt to generate optimizing test cases and/or application programming interface specification 230), or by a prompt generated by large language model 260 to perform similar functionality.

In connection with embodiments of the invention, large language model 260 is accessed and utilized in connection with debugger 249 as well as other functionality associated with integrated development environment 240 when improving debugging of application programming interface 210, to provide for debugging functionality which is as integrated with integrated development environment 210 and complete and thorough as possible. In embodiments of the invention, large language model 260 contains one or more of test case generator 263, application programming interface specification updater 265, and prompt generator 267.

Test case generator 263 represents software and/or hardware for utilization of large language model 260 in generation of test cases for testing of application programing interface 210. In an embodiment of the invention, large language model 260 has input into it one or more test cases previously generated from previous test cases 243, previous errors 245, and application programming interface specification 230 via application programming interface specification access module 241 in order to receive from large language model 260 a modified set of the one or more test cases modified by the large language model 260. The one or more modified test cases may be slightly modified, or more significantly modified in order to avoid errors at much as possible when utilizing application programming interface 210. Each test case may associate one or more variables to be tested with a plurality of parameters for testing of application programming interface 210. In an embodiment of the invention, the one or more modified test case are output from test case generator 263 in a JSON file format which describes one or more parameters, one or more data values for each parameter, as well as a sequence of operations which provides for full and correct testing of application programing interface 210. Presently existing or after-arising equivalents of the JSON file format are specifically contemplated herein.

Application programming interface specification updater 265 represents software and/or hardware for generation and/or updating of application programming interface specification 230 by large language model 260. In embodiments of the invention, large language model 260 is utilized to update application programming interface specification 230 to reflect changes, updates, further testing which led to errors, or other issues. Application programming interface specification 230 may need to be updated for a variety of reasons, all of which are contemplated within the scope of the invention. Application programming interface specification 230 may, for example, be hard to understand, incomplete, not contain all variables to be tested, not contain sufficient parameters for each variable to be tested, or contain other errors. If, for example, the name of a variable is misspelled in application programming interface specification 230, application programming interface specification updater 265 will correct the name of the variable in application programming interface specification 230. An updated application programming interface specification 230 may be utilized in execution of later embodiments of the invention in order for further testing of application programming interface 210.

Prompt generator 267 represents software and/or hardware for automatic generation of prompts to be used in prompt engineering in connection with large language model 260. In an embodiment of the invention, in order for test case generator 263 and application programming interface specification updater 265 to correctly generate test cases and/or update application programming interface specification 230, specific instructions needed to be provided to large language model 260 to perform this functionality. This may take the form of a command prompt to be input into large language model 260. The prompt may itself be generated by prompt generator 267. Prompt generated by prompt generator 267 may include, for example, one or more of instructions, task-specific context/knowledge, examples, previous interaction history, and/or current user question/request. In alternative embodiments of the invention, prompts may be generated by a developer or by integrated development environment 240. In an embodiment of the invention, the application programming interface, one or more test cases previously generated, and one or more errors associated with the one or more previous test cases are input into prompt generator 267 to engineer a scenario specific prompt for input into the large language model 260, and test case generator 263 and application programming interface specification updater 265 are output and automatically utilized for testing of application programming interface 210 by integrated development environment 240.

Figure 3A:
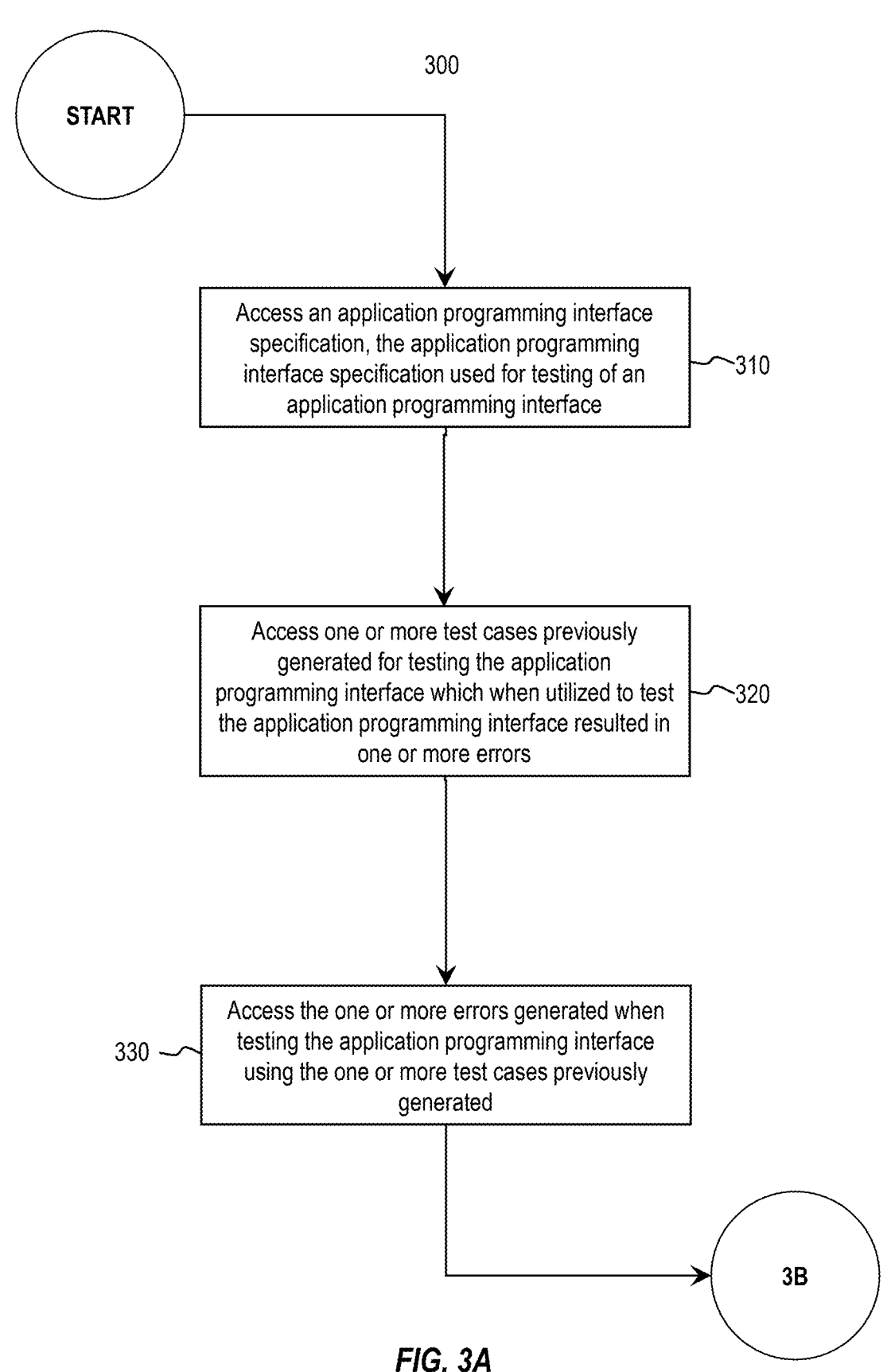
FIGS. 3A and 3B are a flowchart 300 depicting operational steps that a hardware component of a hardware appliance may execute, in accordance with an embodiment of the invention.
Figure 3B:
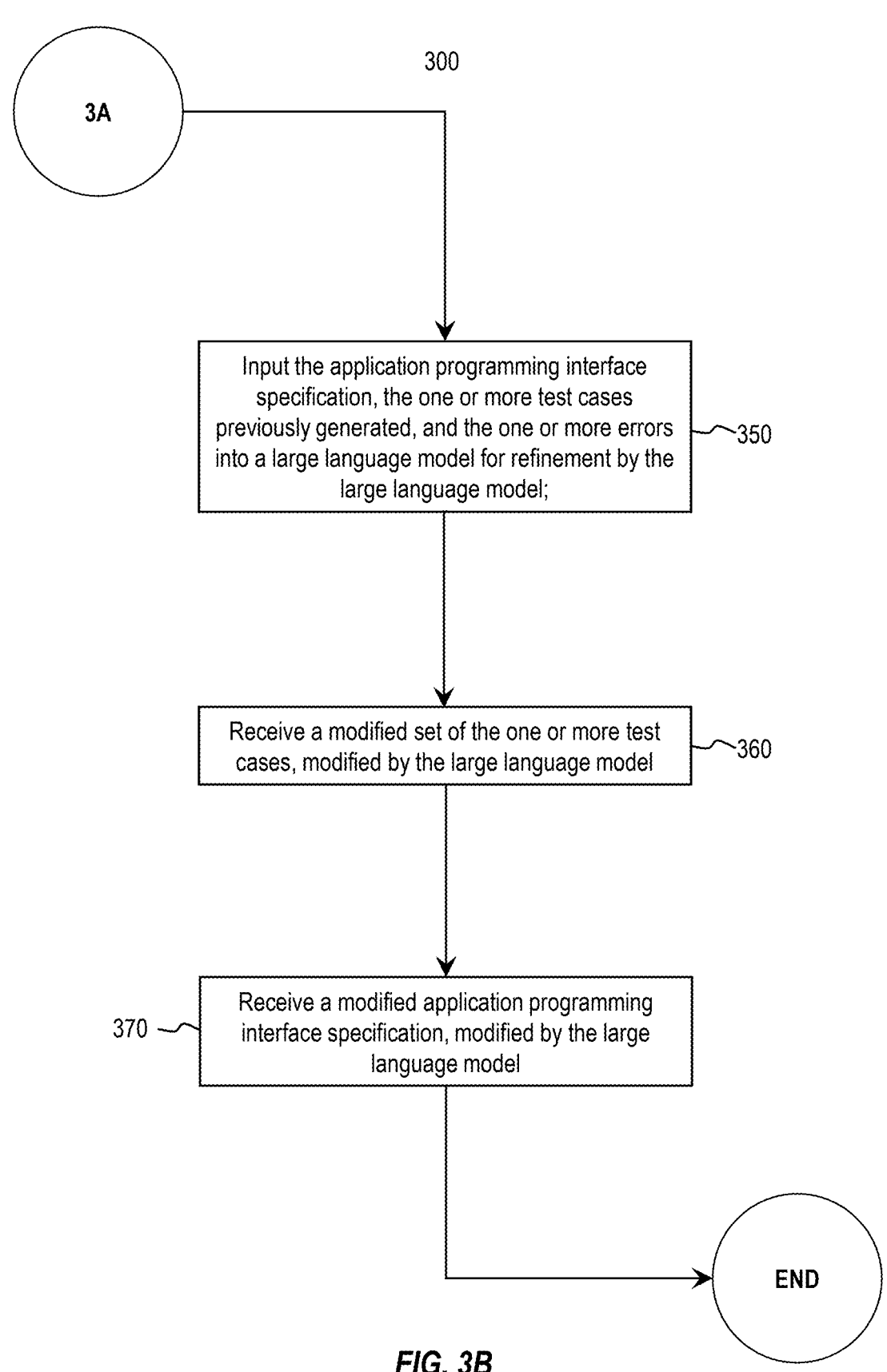

FIG. 3 is a flowchart 300 depicting operational steps that a hardware component, multiple hardware components, and/or a hardware appliance may execute, in accordance with an embodiment of the invention. As shown in FIG. 3, at step 310 integrated development environment 240 accesses an application programming interface specification 230, the application programming interface specification 230 used for testing of an application programming interface 210. At step 320, integrated development environment 240 accesses one or more test cases previously generated for testing the application programming interface 210 which resulted in one or more errors. At step 330, accesses one or more errors generated when testing the application programming interface 210 using the one or more test cases previously generated. At step 350 integrated development environment 240 inputs the application programming interface specification 350, the one or more test cases, and the one or more errors into large language model 260 for refinement by the large language model 260. At step 360, a modified set of the one or more test cases modified by the large language model 260 are received by integrated development environment 240. At step 370, a modified application programming interface specification is received by integrated development environment 240, the modified application programming interface specification modified by the large language model 260.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of using a computing device associated with a large language model to improve testing of an application programming interface in order to minimize errors associated with the application programming interface, the method comprising:

accessing by a computing device an application programming interface specification associated with an application programming interface, the application programming interface specification an electronically available document which describes at least in-part in natural language how to build and utilize functionality associated with the application programming interface specification, the application programming interface specification containing natural language descriptions, source code, and test cases to be used for testing of the application programming interface;

accessing by the computing device from the application programming interface specification one or more test cases previously generated for testing the application programming interface which when utilized to test the application programming interface resulted in one or more errors;

accessing by the computing device the one or more errors generated when testing the application programming interface using the one or more test cases previously generated;

generating automatically by the computing device a scenario specific prompt for input into a large language model, the scenario specific prompt to provide instructions for the large language model to correctly generate test cases and update the application programming interface specification;

inputting automatically by the computing device via the scenario specific prompt the application programming interface specification, the one or more test cases previously generated, and the one or more errors into the large language model for refinement;

receiving a modified set of the one or more test cases, modified by the large language model, the modified set of the one or more test cases generated by the large language model in response to the automatically generated prompt to improve testing of the application programming interface; and receiving from the large language model a modified application programming interface specification, modified by the large language model to improve testing of the application programming interface.

2. The method of claim 1, wherein the modified set of the one or more test cases are automatically utilized for testing of the application programming interface by an interactive development environment.

3. The method of claim 1, wherein the one or more errors are HTTP status codes.

4. The method of claim 1, wherein the application programming interface specification is in a format associated with OpenAPI.

5. The method of claim 1, wherein the application programming interface specification is incomplete or incorrect.

6. The method of claim 1, wherein the one or more test cases previously generated for testing of the application programming interface exist in a JSON file format which describes one or more parameters, one or more data values for each parameter, and a sequence of operations.

7. The method of claim 1, wherein the modified set of the one or more test cases are output in a JSON file format.

8. The method of claim 1, wherein the modified set of the one or more test cases and the modified application programming interface specification are utilized by a debugger in further testing of application programming interface.

9. A computer system associated with a large language model to improve testing of an application programming interface in order to minimize errors associated with the application programming interface, the computer system comprising:

one or more computer processors;

one or more computer-readable storage media;

program instructions stored on the computer-readable storage media for execution by at least one of the one or more processors, the program instructions comprising:

program instructions to access an application programming interface specification associated with an application programming interface, the application programming interface specification an electronically available document which describes at least in-part in natural language how to build and utilize functionality associated with the application programming interface specification, the application programming interface specification containing natural language descriptions, source code, and test cases to be used for testing of the application programming interface;

program instructions to access from the application programming interface specification one or more test cases previously generated for testing the application programming interface which when utilized to test the application programming interface resulted in one or more errors;

program instructions to access the one or more errors generated when testing the application programming interface using the one or more test cases previously generated;

program instructions to generate automatically a scenario specific prompt for input into a large language model, the scenario specific prompt to provide instructions for the large language model to correctly generate test cases and update the application programming interface specification;

program instructions to input automatically by the computing device via the scenario specific prompt the application programming interface specification, the one or more test cases previously generated, and the one or more errors into the large language model for refinement;

program instructions to receive a modified set of the one or more test cases, modified by the large language model, the modified set of the one or more test cases generated by the large language model in response to the automatically generated prompt to improve testing of the application programming interface; and program instructions to receive from the large language model a modified application programming interface specification, modified by the large language model to improve testing of the application programming interface.

10. The computer system of claim 9, wherein the modified set of the one or more test cases are output and automatically utilized for testing of the application programming interface by an interactive development environment.

11. The computer system of claim 9, wherein the one or more errors are HTTP status codes.

12. The computer system of claim 9, wherein the application programming interface specification is in a format associated with OpenAPI.

13. The computer system of claim 9, wherein the one or more test cases previously generated for testing of the application programming interface exist in a JSON file format which describes one or more parameters, one or more data values for each parameter, and a sequence of operations.

14. A computer program product associated with a large language model to improve testing of an application programming interface in order to minimize errors associated with the application programming interface, the computer program product comprising:

one or more non-transitory computer-readable storage media and program instructions stored on the one or more non-transitory computer-readable storage media capable of performing a method, the method comprising:

accessing by a computing device an application programming interface specification associated with an application programming interface, the application programming interface specification an electronically available document which describes at least in-part in natural language how to build and utilize functionality associated with the application programming interface specification, the application programming interface specification containing natural language descriptions, source code, and test cases to be used for testing of the application programming interface;

accessing by the computing device from the application programming interface specification one or more test cases previously generated for testing the application programming interface which when utilized to test the application programming interface resulted in one or more errors;

accessing by the computing device the one or more errors generated when testing the application programming interface using the one or more test cases previously generated;

generating automatically by the computing device a scenario specific prompt for input into a large language model, the scenario specific prompt to provide instructions for the large language model to correctly generate test cases and update the application programming interface specification;

inputting automatically by the computing device via the scenario specific prompt the application programming interface specification, the one or more test cases previously generated, and the one or more errors into the large language model;

receiving a modified set of the one or more test cases, modified by the large language model, the modified set of the one or more test cases generated by the large language model in response to the automatically generated prompt to improve testing of the application programming interface; and receiving from the large language model a modified application programming interface specification, modified by the large language model to improve testing of the application programming interface.

15. The computer program product of claim 14, wherein the one or more errors are HTTP status codes.

16. The computer program product of claim 14, wherein the application programming interface specification is in a format associated with OpenAPI.

\* \* \* \* \*